United States Patent [19]

Pingaud

[11] Patent Number: 5,395,672

[45] Date of Patent: Mar. 7, 1995

[54] LARGE-CAPACITY MAGNETIC MEMORY CARD AND MANUFACTURING METHOD

[75] Inventor: Bernard Pingaud, Bendol, France

[73] Assignee: Kiota, La Ciotat, France

[21] Appl. No.: 678,254

[22] PCT Filed: Oct. 17, 1989

[86] PCT No.: PCT/FR89/00536

§ 371 Date: Jun. 18, 1991

§ 102(e) Date: Jun. 18, 1991

[87] PCT Pub. No.: WO90/04843

PCT Pub. Date: May 3, 1990

[30] Foreign Application Priority Data

Oct. 18, 1988 [FR] France .................. 88 14217

[51] Int. Cl.$^6$ ................. G11B 5/00
[52] U.S. Cl. ................. 428/141; 428/327;
428/328; 428/329; 428/335; 428/336; 428/337;
428/412; 428/421; 428/422; 428/425.9;
428/694 BF; 428/900; 235/493; 283/82;
283/904; 360/2
[58] Field of Search ............... 428/64, 402, 694, 900,
428/327, 421, 422, 425.9, 328, 329, 141, 412,
335, 336, 337, 694 BF; 252/62.54, 62.63;
235/493; 283/82, 904; 360/131, 135, 2; 427/130

[56] References Cited

U.S. PATENT DOCUMENTS

| 3,607,528 | 9/1971 | Gassaway ............... 156/230 |
| 3,808,404 | 4/1974 | Riggs ............... 235/61.12 M |
| 4,336,242 | 6/1982 | Schmid Berger et al. ........ 423/594 |
| 4,391,851 | 7/1983 | Yamada ............... 427/130 |
| 4,639,794 | 1/1987 | Ferrier ............... 360/46 |
| 4,671,885 | 6/1987 | Gaud et al. ............... 252/62.59 |
| 4,701,372 | 10/1987 | Akiyama et al. ............... 428/323 |
| 4,726,992 | 2/1988 | Asai et al. ............... 428/329 |
| 4,973,515 | 11/1990 | Otonari et al. ............... 428/315.5 |
| 4,977,040 | 12/1990 | Yano et al. ............... 428/692 |
| 4,992,328 | 2/1991 | Kato et al. ............... 428/323 |
| 5,075,169 | 12/1991 | Nagai et al. ............... 428/402 |
| 5,135,733 | 8/1992 | Robert et al. ............... 423/594 |

FOREIGN PATENT DOCUMENTS

| 0146056 | 6/1985 | Europe . |
| 2605623 | 4/1988 | France . |
| 3529756 | 2/1986 | Germany . |
| 3727197 | 2/1988 | Germany . |
| 2206548 | 6/1974 | France . |
| 1269660 | 6/1968 | Germany . |
| 2120070 | 8/1972 | France . |

Primary Examiner—Stevan A. Resan
Attorney, Agent, or Firm—Oblon, Spivak, McClelland, Maier & Neustadt

[57] ABSTRACT

The invention relates to a high density high energy magnetic memory card. The card is provided throughout or part of at least one of its surfaces with a recording medium which contains magnetic particles having a coercitive field higher than 4000 Oe (320 kA/m), which has no overlying layer and which has a density of information higher than 5 kbits/cm$^2$, an electric wear corresponding to an electric signal loss equal to or lower than 5% for 2000 passages, a mean arithmetic rugosity lower than 10 nm, an abrasivity lower than 600 $\mu$m, and a streak resistance lower than 1.5 $\mu$m. Application to portable files and access controls.

13 Claims, No Drawings

LARGE-CAPACITY MAGNETIC MEMORY CARD AND MANUFACTURING METHOD

The present invention relates to a large-capacity magnetic memory as well as to a method implemented in its manufacture. This card is particularly useful for setting up a system of decentralized portable files.

High density magnetic recording media having information density values of more than 50 kbits/cm$^2$ are known. However, they can be erased either by external fields or by mechanical effects, and are used only on tapes or disks that can be protected by sleeves, or on cassettes. This is why, up till now, magnetic recording media on cards having an information density of more than 5 kbits/cm$^2$ have not been commercially available, the usual density of known magnetic cards being in the range of 0.1 to 0.3 kbits/cm$^2$. Portable cards, in their common uses, are subjected to handling and to environmental stresses that may damage the magnetic layer and the information stored therein, all the more irremediably as the density of the information in the layer is higher. Besides, the magnetic medium should be incapable of being erased by the usual external magnetic fields in order to ensure safety, and it should withstand wear and tear so that the information can be re-read a great many times.

It would be highly desirable to have a magnetic card that is capable of containing a large quantity of data that can be replenished or updated and, at the same time, has appropriate characteristics of safety and permanence.

Such a card could be used for numerous applications such as personal or individual medical files in human and veterinary medicine, machine maintenance sheets, the management of parking lots, stocks, livestock, operations on bank accounts etc.

The manufacturing of such a card, however, raises many difficulties.

It is known that high recording density calls for the smallest possible head/layer spacing, in order to maintain the quality of the signal during the writing and reading operations. However, to protect the magnetic layer during the usual handling operations, a protective overcoat is generally provided. This overcoat contributes to an increase in the head/layer spacing. The two above-named goals, namely signal quality and protection protection, are therefore incompatible a priori.

Furthermore, the card support and the magnetic medium itself must have a certain elasticity, i.e. they should be capable of recovering their initial shape even after repeated bending, and of doing so without causing any cracks in the magnetic medium. Hence, said medium should not be brittle. Nor should it be too soft for it would then be less resistant to wear and an overcoat would be unavoidably necessary. The card should also be thermally stable to withstand the usual environmental temperatures without deformation. These requirements of elasticity and heat stability are particularly important for a high-capacity card that has to contain a large number of tracks/cm. The poly(vinyl chloride) supports commonly used for low-density magnetic cards (bearing ISO tracks for example) tolerate these stresses more easily since they have only a few tracks and are therefore less dependent on an accurate positioning of the head with respect to the layer.

An object of the present invention is a high-capacity magnetic memory card made of a semi-rigid and dimensionally stable support having, on the major part of at least one of its surfaces, a magnetic recording medium containing magnetic particles having a coercive field strength of over 4,000 Oe (320 kA/m) and, preferably, over 5,000 Oe (400 kA/m), a binder and additives, said medium having no overcoat and exhibiting an electrical wear corresponding to a loss of electric signal of less than 5% for 2,000 passes, and preferably for more than 20,000 passes, an average peak-to-valley height of less than 10 nm, an abrasive characteristic of less than 600 $\mu$m, scratch resistance of less than 1.5 $\mu$m and an information density of at least 5 kbits/cm$^2$, preferably higher than 50 kbits/cm$^2$.

The above parameters shall be defined further below in the description of the measurement tests.

The card according to the invention contains at least 10 tracks/cm and preferably 40 tracks/cm. Thus, for a card with the standard size of 54×86 mm, and depending on the area coated, it is possible to obtain a total capacity of one Mbit or more.

The present invention also provides a method for the manufacture of the above-mentioned card, according to which the surface of the magnetic recording medium is treated on a polished glass plate during the hot pressing of the card, possibly at the same time as the binder is cross-linked.

All the above-claimed characteristics can be used to obtain a portable memory card that meets the requirements of high recording capacity and high resistance to strains and handling and has magnetic properties such that information can be stored, read and given permanent and efficient protection.

According to the invention, the magnetic medium of the card exhibits an electric wear corresponding to a loss of electric signal of 5% or less for at least 2,000 passes and, preferably, for at least 20,000 passes, an average peak-to-valley height of less than 10 nm, and an abrasive characteristic of less than 600 $\mu$m, and a scratch resistance of less than 1.5 $\mu$m. These parameters are measured by the following test procedures.

Electric wear test

On a magnetic recording medium, a certain number of tracks uniformly distributed on the whole of the magnetic layer are selected.

A signal is recorded on each track. This signal is read for a determined number of times (number of passes). The amplitude of the reading signal is measured by means of an oscilloscope. The loss of signal corresponds to the difference between the first and last readings and is expressed in % of the signal obtained during the first reading.

Roughness test

The magnetic medium to be tested is moved at 40 $\mu$m/s over a 2 mm distance. A converter is used to measure the displacement of a sensor. That part of the sensor that is in contact with the medium is a ball having a 5 $\mu$m radius. The strength applied to this ball is 0.03 mN. The analog voltage at the output of the converter, which is proportional to the oscillations of the sensor, is digitally processed in a computer that computes the roughness criteria. The value that shall be used is the arithmetic mean roughness (average arithmetical deviation of the profile from the mean line, integrated with the length of the base).

Abrasive characteristic test

The method used to measure the abrasive characteristic of a layer consists in moving a copper torus, 1400 times to and fro on the layer to be tested, over a distance of five cm, with a constant strength of application F=0.6N and at a speed of 8 cm/s, said copper torus having a Vickers hardness of 52, a thread diameter of 1.6 Mm and an inner loop radius of 8 mm.

An abrasion pattern, represented by a pseudo-ellipse, is obtained on the torus, the main axis of this pseudo-ellipse being all the wider as the layer is more abrasive. The length of the main axis of the pseudo-ellipse is measured with a microscope fitted out with a micrometric optotype. This length is used as a parameter for defining the abrasive characteristic.

Scratch test

The scratch test is carried out by making a spherical diamond with a radius R=15 μm pass over the surface of the magnetic recording medium under a 4 g load.

The scratch resistance is expressed as the depth of the scratch in μm, calculated from the half-width a of the imprint created by the diamond on the layer, according to the formula:

$$\text{Depth} = R - R\sqrt{1 - \frac{a^2}{R^2}}$$

The magnetic particles used are Ba or Sr hexaferrite particles having a strong coercive field with a strength of over 4,000 Oe and, preferably, over 5,000 Oe. A strong coercive field such as this ensures the safety of the information recorded which cannot be erased by by the usual external fields while, at the same time, providing a capacity of rewriting by overwriting.

Barium or strontium hexaferrite particles have long been known. In particular, they can be obtained by coprecipitating a ferric salt and a Ba or Sr salt in an alkaline solution and then calcinating the obtained coprecipitate at high temperature. C. D. Mee and J. C. Jeschke in "Single-Domain Properties In Hexagonal Ferrites", *Journal of Applied Physics*, Vol. 34, No. 4, 1271-2, 1963, describe the preparation of such particles. This old method has the disadvantage, however, of giving a product in the form of very hard blocks that are very difficult to grind. The particles, after grinding, have non-homogeneous sizes, are hard to disperse in the binders used for magnetic media and tend to form agglomerates in the calcination treatment. These disadvantages render the particles inappropriate for the preparation of magnetic recording layers. Many methods have recently been proposed to remedy these disadvantages: these include hydrothermal synthesis and improved methods of coprecipitation.

A preferred method for the preparation of hexaferrites the one that is the object of the French patent application No. 8814221 entitled "Method For Preparing Hexaferrite Magnetic Particles, Particles Obtained, And Product Containing Them". This method exhibits the advantage of giving hexaferrite particles with a ratio of the switching field distribution (SFD) to the coercive field (SFD/Hc ratio) of less than 0.45 and preferably less than 0.40, and a magnetization saturation of over 55 emu/g and preferably over 60 emu/g.

The SFD characterizes the width of the switching field distribution. The hysteresis cycle (magnetic flux M as a function of the magnetic field H) is used to plot the curve dM/dH as a function of H (derived from the hysteresis cycle) and the width at mid-height H of the peak observed when H=Hc is computed. This value is called the SFD. This value of SFD is divided by the coercive field of the particles to give the dimensionless ratio SFD/Hc.

A low value of SFD/Hc indicates that the magnetic moments of the particles switch for a field close to the coercive field. The flux transitions during a magnetic recording will therefore be better defined, the thickness of the recorded layer will be smaller and and better defined, thus making for a lower noise level and hence for a higher signal-to-noise ratio, especially when the information density is high. A low SFD/Hc indicates also a narrow distribution of the particle sizes, a non-agglomeration of said particles and a purer chemical composition.

The magnetization and the coercive field are measured with a VSM (Vibrating Sample Magnetometer) with a maximum magnetizing field strength of 20,000 Oe (1,590 kA/m).

A preferred embodiment uses Ba or Sr hexaferrite particles having an acicularity ratio of at least 1.5:1, a length of 0.1 to 0.3 μm and a coercive field strength of more than 4,000 Oe and preferably more than 5,000 Oe.

Portable cards are liable to be bent and carelessly handled. The greater the number of tracks/cm, the more vitally important is the selection of the binder of the magnetic composition, since this binder should have fairly high cohesion to keep the magnetic particles in place and to withstand permanent deformation caused by stresses such as bending and compression, as should also have hardness sufficient to stand up to abrasion and scratches.

It has been found that a medium including (a) a binder formed by a cross-linked three-dimensional polyurethane and (b) a poly(tetrafluoroethylene), possibly including polyethylene, gives the card the desired properties.

The cross-linked three-dimensional polyurethane is formed out of (a) a branched polyol having a mean molecular weight of less than 4,000 and containing at least 8% by weight of OH groups and (b) a prepolymer of an isocyanate comprising at least three isocyanate functions. As a polyol, it is possible to use aromatic or aliphatic polyester-polyols or polyether-polyols.

The polyester-polyols are also compounds containing hydroxyl groups prepared from dicarboxylic acids or derivatives of these acids such as their anhydrides, e.g. adipic acid, the terephthalic, phthalic, isophthalic, tetrahydrophthalic, hexahydrophthalic acids, maleic acid and polyfunctional alcohols such as glycols, glycerol, hexanediol, hexanetriol, neopentylglycol, trimethylolpropane, pentaerythrol, etc.

The polyether-polyols are also compounds containing hydroxyl groups prepared from alkylene oxides and from the same alcohols as those described above for polyesters.

The quantity of —COOH groups coming from the acids and of —OH groups coming from the alcohols is such that the OH/COOH ratio is greater than 1. By condensation, all the COOH groups react, while there remain free hydroxyl groups. The polyols used according to the invention include at least 8% by weight of OH groups. Preferably, the dicarboxylic acid is a hydrogenated phthalic acid, possible in admixture with other acids, and the polyfunctional alcohol is a trimethylol propane, possibly in admixture with other alcohols.

The term "isocyanate prepolymer", commonly used in polyurethane chemistry, designates a compound having at least three isocyanate functions, i.e. having a functionality of at least 3. Such compounds can be obtained, for example, from three moles of an aliphatic or aromatic diisocyanate and one mole of a trivalent alcohol such as glycerol, hexanetriol or trimethylol propane.

The respective quantities of polyol and isocyanate are such that the NCO/total OH ratio is greater than 0.9 and preferably equal to or greater than 1. The term "total OH" means that, if the magnetic medium has a source of OH groups other than polyol, said source of OH groups should be taken into account to calculate the isocyanate prepolymer content so that the mixture is entirely cross-linked.

The mixture of binders is present in the recording medium in a proportion of 10 g to 60 g per 100 g of magnetic particles.

As is known, the magnetic medium further includes a certain number of additives such as surfactants, lubricants, pigments etc. These additives should not be liable to exude from the layer and disturb its surface.

There are known ways of introducing lubricants into the magnetic layers to reduce the coefficient of friction between the head and the layer, reduce the wear of both these elements and improve the sliding properties of the layer.

Liquid lubricants are not appropriate since they tend to exude from the -magnetic medium when the temperature rises, especially when the final treatment of the magnetic support requires high temperatures, for example temperatures higher than 100° C. or even higher than 150° C. This is why the preferred lubricants used are solid lubricants in which more than 90% and, preferably, more than 99% of the particles have a size smaller than than 3 $\mu$m, these solid lubricants being used in a proportion of less than 2% by mass in relation to the mass of the magnetic particles.

The solid lubricant used may take the form of fine particles of graphite, molybdenum sulfide, tungsten sulfide or polyethylene. Preferably, poly(tetrafluoroethylene) (PTFE) is used. PTFE is sold in powder form by several manufacturers. For example, it is sold under the trade name of Vydax by Du Pont de Nemours. It is of important, firstly, that the solid lubricant should be compatible with the other constituents of the recording medium and that it should contain no more than 10%, preferably no more than 1%, of particles having a size greater than 3 $\mu$m and, secondly, that the content of this solid lubricant in the magnetic medium should not exceed 2% of the mass of the magnetic particles. A sizewize distribution such as this of the lubricant particles can be obtained by screening, filtration or any other known technique.

Without being bound by theoretical considerations, it is believed that the cross-linked structure of the binder is such that it allows the trapping of solid lubricant particles having a size of less than 3 $\mu$m.

The poly(tetrafluoroethylene)-based solid lubricant may be associated with an inert polymer such as a polyolefine, for example polyethylene.

In addition to the poly(tetrafluoroethylene) as described here above, it is possible to use known lubricants such as silicon oils in a quantity of less than 1 part per 100 parts, by weight, of magnetic particles. A magnetic medium in keeping with the above characteristics is the one disclosed in the French patent application No. 8814219 entitled "Magnetic Recording Medium".

The other additives are those generally used in magnetic recording media.

One or more surfactants are necessary to ensure the wettability, dispersibility and spreading of the dispersion. For example, it is possible to use an ester of polycarboxylic acid or a complex organic ester of phosphoric acid, lethicin, fatty acids such as palmitic acid, oleic acid or a mixture of these surfactants. A vinyl copolymer based on vinyl chloride comprising OH groups can also be used as a dispersing agent. Such a copolymer generally has 70% to 90% of vinyl chloride, the other monomers being chosen from among vinylacetate, polyvinyl alcohol, and acrylic or methacrylic esters possibly having hydroxyl groups. In the latter case, the quantity of compounds having isocyanate groups must be calculated so as to take account of the OH groups of the vinyl copolymer, which itself should also be completely cross-linked within the three-dimensional polyurethane lattice. A preferred embodiment uses an alkylphenoxypolethoxyethyl ester of phosphoric acid, in a proportion of 3 to 8 g per 100 g of magnetic particles and a vinyl copolymer in a proportion of less than 10% by mass in relation to the total binder.

In addition, the binder compositions may include the usual additives such as abrasive powders, e.g. $Al_2O_3$ or $Cr_2O_3$, pigments in the form of fine powder or in colloid form, e.g. carbon black to color the layer, and silica to improve the quality and the stability of the dispersion.

Finally, the binder composition may also include agents to further the cross-linking process, depending on the binder used and on the desired kinetics.

A coating dispersion is formed by the mixing of magnetic particles, the various constituents of the binder and the additives in the presence of solvents. Solvent mixtures known in the technique of magnetic dispersion are used.

Among useful solvents, we might cite esters such as methyl acetate, ethyl acetate, isopropyl acetate, tetrahydrofurane; ketones such as methylethylketone, methylisobutyl ketone and cyclohexanone; nitromethane, nitroethane, dichloroethane, benzenic solvents such as toluene etc. The necessary quantities of solvents can be determined by the technician according to the results desired, the particular compounds of the dispersion and the apparatus used. Particularly promising dispersions are described in the examples.

The binder composition is applied to a support that will subsequently become an integral part of the final card. This support should be compatible with the other plastic sheets forming the card. In particular it should be capable of being hot welded to these sheets. Furthermore, the support contributes to the final properties of the card. It should be dimensionally stable, heat resistant and flexible. Any plastic polymer material meeting these requirements may be used such as, for example, polyolefines, cellulose acetates, polyethylene terephthalate, polyimide, polysulfone etc. It may be capable of being bonded under heat to the plastic sheets constituting the card, with or without an additional adhesive layer.

In a preferred embodiment, the support used is a polycarbonate support having a thickness of between 20 $\mu$m and 80 $\mu$m, and preferably between 40 $\mu$m and 50 $\mu$m. Polycarbonate is known to be dimensionally stable and heat resistant. The polycarbonate used should, however, be one that can be hot welded at temperatures that do not degrade the binder of the magnetic dispersion applied thereon.

After coating, the magnetic particles can be oriented, possibly longitudinally, by any known method, and then dried. The resulting layer has a thickness, in the dry state, of less than 10 μm and preferably less than 6 μm. The magnetic film, such as the one described above, or possibly two magnetic films if the card is to have a magnetic medium on each face, are joined with one or more plastic sheets constituting the core of the card, so as to obtain a total card thickness of 400 μm to 1000 μm. The plastic material of the sheets and of the magnetic film supports are chosen so that they can be welded by heat. The sheets of one and the same card may be made of one and the same plastic material or of different plastic materials.

In a preferred embodiment, the same plastic material is used to make the core sheets of the card as well as the support of the magnetic layer. The sheets other than those supporting the magnetic layer may have a thickness of 20 μm to 300 μm. A magnetic layer can be placed on only one side of the card or on both sides, on their entire surface or on only part of the surface. The parts that are still unoccupied can be used to print visible information such as letters, drawings, text, photographs, graphs etc.

According to the method of the invention, the plastic sheets are welded by hot pressing, the magnetic medium being applied to a polished glass plate.

In one embodiment, the plastic sheets are joined together to form a sandwich comprising a magnetic layer on one side or on both sides and the sandwich is placed between two polished glass plates, the magnetic media being applied to the glass plates. The whole is placed either in a hot pressing machine or in a high-frequency pressing machine. The temperature should be higher than the glass transition temperature of the plastic support and binder materials used, and lower than the degradation temperature of the binder. In general, this temperature is between 80° C. and 200° C. and, when the binder is a cross-linked polyurethane, as described above, and the support is polycarbonate, the temperature of the pressing machine is between 130° C. and 190° C. and preferably between 160° C. and 180° C. Depending on whether a hot pressing machine or a high frequency press is used, the pressure may vary between 100 and 1,000 N/cm².

Finally, the sandwich is cooled under pressure.

A method as indicated above is described in the French patent application No. 841220 entitled: "Method For The Surface Treatment Of Magnetic Layers".

When polycarbonate sheets are used, the method of the French patent application No. 8814222 entitled "Method For Welding Polycarbonate Sheets" can be used.

This method exhibits the advantage of combining, in one step: (1) the assembling of the card (2) the cross-linking of the binder and (3) the surface treatment of the magnetic layer.

The cards can be cut to the dimensions of the present standards for portable cards, i.e. 54 mm × 86 mm. They may also be bigger or smaller.

They may be cut before or after the hot welding of the card. In a preferred embodiment, an intermediate cutting operation involving several cards is carried out. The sheets of plastic material involved in these intermediate cutting operations are held together by ultrasonic welding spots before being subjected to hot pressing.

After cooling, the cards are finally cut to the desired final size by any known method.

The magnetic medium of the finished cards exhibits a coercive field strength of more than 4,000 Oe and more frequently between 4,500 and 6,000 Oe, a saturation magnetization of more than 60 emu/cm³ and preferably more than 80 emu/cm³ and a ratio of the switching field distribution to the coercive field of less than 0.50 and, preferably, less than 0.30.

As for the powders, the magnetization and coercive field are measured with a VSM (vibrating sample magnetometer) under a maximum magnetizing field of 20,000 Oe ( 1,590 kA/m).

The following examples illustrate the invention.

The following commercially available products were used.

Desmophen TM : registered trademark for a group of polyesters or polyethers cross-linkable by isocyanates, sold by Bayer AG.

Desmodur TM : registered trademark for a group of isocyanates or isocyanate prepolymers by isocyanates, sold by Bayer AG.

Gafac TM : registered trademark for a group of anionic surfactants that are complex organic esters of phosphates, sold by General Aniline and Film Corp.

Vinnol TM : registered trademark for copolymers of polyvinyl alcohol, sold by Wackerchemie Gesselschaft.

Vydax TM : registered trademark for fluorocarbon telomers sold by E. I. Du Pont de Nemours Lexan TM : registered trademark for polycarbonates sold by General Electric Co.

Barium hexaferrite particles used in all the examples are prepared by the method of the French patent application No. 8814221. They exhibit an acicularity of between 1.5:1 and 3:1 and a length between 0.1 and 0.3 μm. Their saturation magnetization is 62±2 emu/g, their coercive field strength values are between 4,700 Oe and 5,300 Oe, their SFD is between 1,800 and 2,100 and their SFD/Hc ratio is between 0.34 and 0.45.

The results of the mechanical and magnetic measurements on the cards obtained are marshalled in the table here below for all the examples.

It is further observed that, in all the examples, the cards obtained show excellent resistance to solvents, temperature and external attacks. Repeated bending fails to cause any damage to the magnetic layer.

EXAMPLE 1

A dispersion of magnetic particles is prepared, comprising:

| | |
|---|---|
| Ba hexaferrite particles | 100.0 g |
| GAFAC TM RE 610 Surfactant | 7.0 g |
| Vinnol E22/40 A | 1.0 g |
| SiO₂ | 1.0 g |
| Cr₂O₃ | 3.0 g |
| Al₂O₃ | 6.0 g |
| Carbon black | 3.0 g |
| Desmophen TM 651 | 15.8 g |
| Desmodur TM L | 18.2 g |
| Vydax TM AR | 0.4 g |

The following solvent mixture is added to the dispersion, at the rate of 55 parts of dispersion per 45 parts of solvent mixture:

| ethyl acetate | 50 parts |
| --- | --- |
| THF | 25 parts |
| methyl acetate | 15 parts |

After shaking and filtration, the dispersion is applied to a sheet of LEXAN TM 8800 polycarbonate with a 40–60 μm thickness, and dried to obtain a layer having a dry thickness of 6 μm. A rectangle of the film obtained is applied to a stack of polycarbonate sheets, giving a total thickness of 600 μm. Four ultrasonic welding spots are used to hold the sandwich in position, then the sandwich is applied by its magnetic film side to the glass plate and is welded at a temperature between 160° C. and 180° C., under a pressure of 100 to 1000N/cm². A card is cut to ISO standard dimensions (54×86 mm) and the magnetic and mechanical properties of this card are determined. The electric wear test is carried out on a 200 μm wide track, at a recording speed of 200 mm/s, and a frequency of 14.6 kHz. (This corresponds to a density of 1,457 bits/cm). The number of passes is 2,000.

EXAMPLE 2

A magnetic dispersion is prepared, containing:

| Ba hexaferrite particles | 100.0 g |
| --- | --- |
| GAFAC TM RE 610 | 3.0 g |
| Vinnol TM 22/40 | 2.0 g |
| SiO₂ | 1.5 g |
| Al₂O₃ | 15.0 g |
| Carbon black | 3.0 g |
| Desmophen TM 651 | 20.8 g |
| Desmodur TM L | 27.2 g |
| Poly(tetrafluoroethylene)/polyethylene copolymer (50/50) (dimension of particles equal to or smaller than 3 μm) | 1.0 g |

The following mixture is used as a solvent, at the rate of 53 parts of dispersion per 47 parts of mixture of solvents:

| Isopropyl acetate | 55 parts |
| --- | --- |
| Nitroethane | 15 parts |
| Dichloroethane | 20 parts |
| Methylisobutylketone | 10 parts |

A card is prepared as in the preceding example, and the electric wear test is carried out under the same conditions as in the preceding example.

EXAMPLE 3

A magnetic dispersion is prepared, containing:

| Barium hexaferrite particles | 100 g |
| --- | --- |
| Ester of polycarboxylic acid | 6 g |
| Vinnol TM E22/40A | 1 g |
| SiO₂ | 2 g |
| Al₂O₃ | 15 g |
| Carbon black | 3 g |
| Desmophen TM 651 | 21.4 g |
| Desmodur TM L | 27.9 g |
| Poly(tetrafluoroethylene)/polyethylene copolymer (50/50) (dimension of particles equal to or smaller than 3 μm) | 1.5 g |

The following mixture is used as a solvent, at the rate of 62 parts of dispersion per 38 parts of mixture of solvents:

| Ethyl acetate | 50 parts |
| --- | --- |
| Methylisobutylketone | 25 parts |
| Nitroethane | 25 parts |

A card is prepared as in example 1, and the electric wear test is carried out under the same conditions as in the example 1.

EXAMPLE 4

A magnetic dispersion is prepared, containing:

| Barium hexaferrite particles | 100 g |
| --- | --- |
| GAFAC TM RE 610 | 3 g |
| Silicone Byk TM -310 | 0.1 g |
| Vinnol TM E22/40A | 2.0 g |
| SiO₂ | 1.5 g |
| Al₂O₃ | 15 g |
| Carbon black | 3 g |
| Desmophen TM 651 | 20.2 g |
| Desmodur TM L | 27.5 g |
| Poly(tetrafluoroethylene)/polyethylene copolymer (50/50) (dimension of particles equal to or smaller than 3 μm) | 1.0 g |

The following mixture is used as a solvent, at the rate of 58 parts of dispersion per 42 parts of mixture of solvents:

| Cyclohexanone | 22 parts |
| --- | --- |
| Ethyl acetate | 9 parts |
| Methylethylketone | 60 parts |
| Toluene | 9 parts |

A card is prepared as in example 1, and the electric wear test is carried out under the same conditions, except that the number of passes is 24,000.

EXAMPLE 5

A magnetic dispersion is prepared, containing:

| Barium hexaferrite particles | 100.0 g |
| --- | --- |
| GAFAC TM RE 610 | 3.0 g |
| Lecithin | 3.0 g |
| Silicone Byk TM -310 | 0.2 g |
| SiO₂ | 15 g |
| Al₂O₃ | 1.5 g |
| Vinnol TM 22/40 | 2 g |
| Desmophen TM 651 | 20.5 g |
| Desmodur TM L | 28 g |
| Poly(tetrafluoroethylene)/polyethylene copolymer (50/50) (dimension of particles equal to or smaller than 3 μm) | 1.2 g |

The following mixture is used as a solvent, at the rate of 61 parts of dispersion per 39 parts of mixture of solvents:

| Cyclohexanone | 20 parts |
| --- | --- |
| Ethyl acetate | 20 parts |
| Methylethylketone | 38 parts |
| Toluene | 22 parts |

A card is prepared as in example 1, and the electric wear test is carried out under the same conditions, except that the number of passes is 24,000.

EXAMPLE 6

A magnetic dispersion is prepared, containing:

| | |
|---|---|
| Barium hexaferrite particles | 100.0 g |
| Dextrol OC 70 sold by Dexter | 2.0 g |
| Palmitic acid | 1.5 g |
| SiO$_2$ | 1.5 g |
| Al$_2$O$_3$ | 15 g |
| Vinnol TM 22/10 | 1.5 g |
| Desmophen TM 651 | 20.8 g |
| Desmodur TM L | 28 g |
| Poly(tetrafluoroethylene)/polyethylene copolymer (50/50) (dimension of particles equal to or smaller than 3 μm) | 1 g |
| Vydax TM | 1 g |

The following mixture is used as a solvent, at the rate of 55 parts of dispersion per 45 parts of mixture of solvents:

| | |
|---|---|
| Cyclohexanone | 12 parts |
| Ethyl acetate | 25 parts |
| Methylethylketone | 63 parts |

A card is prepared as in example 1, and the electric wear test is carried out under the same conditions, except that the number of passes is 24,000.

TABLE

| Examples | 1 | 2 | 3 | 4 | 5 | 6 |
|---|---|---|---|---|---|---|
| Magnetic characteristics | | | | | | |
| Coercive field Oe | 4650 | 4850 | 5000 | 5000 | 6000 | 5700 |
| (kA/m) | (370) | (386) | (398) | (398) | (477) | (453) |
| SFD Oe | 2000 | 2000 | 1700 | 1200 | 1200 | 1350 |
| (kA/m) | (159) | (159) | (135) | (95) | (95) | (107) |
| Im emu/cm$^3$ | 82 | 86 | 69 | 89 | 91 | 99 |
| SFD/Hc | 0.43 | 0.41 | 0.34 | 0.24 | 0.20 | 0.24 |
| Mechanical characteristics | | | | | | |
| Electric wear test | | | | | | |
| for 2,000 passes | <1% | <1% | <1% | | | |
| for 24,000 passes | | | | <1% | <1% | <1% |
| Roughness nm | 6.5 | 7.8 | 8.8 | 9 | 7 2 | 6.2 |
| Abrasive characteristic (μm) | 510 | 425 | 510 | 400 | 480 | 400 |
| Scratch resistance (μm) | 1.25 | 0,85 | 1.25 | 0.37 | 0.93 | 0.67 |

I claim:

1. A magnetic memory card having at least 40 tracks/cm comprised of a 20–80 μm thick polycarbonate support having on the major part of at least one of its surfaces a magnetic recording medium containing Ba or Sr hexaferrite particles having an aspect ratio of between 1.5:1 and 3:1, a length of 0.1 to 0.3 μm and a coercive field with a strength of over 5000 Oe, a binder formed by a cross-linked three dimensional polyurethane formed from a branched polyol having a mean molecular weight of less than 4,000 and containing at least 8% by weight OH groups and an isocyanate prepolymer containing at least three isocyanate groups, and at least one solid particulate lubricant present in an amount of less than 2 wt % based on the weight of magnetic particles, said solid particulate lubricant being tetrafluoroethylene polymer particles of which at least 99% have a size smaller than 3 μm, said magnetic recording medium having no overcoat layer and having an information density of at least 50 kbits/cm$^2$, wear corresponding to a loss of electric signal equal to or smaller than 5% for 2000 passes, an average peak-to-valley height of less than 10 nm, an abrasive characteristic of less than 600 μm, and a scratch resistance of less than 1.5 μm.

2. The card according to claim 1, having wear corresponding to a loss of electric signal equal to or smaller than 5% for at least 20,000 passes.

3. The card according to claim 1, wherein the magnetic particles have a ratio of the switching field distribution to the coercive field that is equal to or smaller than 0.45 and a saturation magnetization of over 55 emu/g.

4. The card according to claim 3, wherein said Ba or Sr hexaferrite particles have a ratio of the switching field 5. The card according to claim 1, wherein said solid lubricant includes a polyolefin in addition to the poly (tetrafluoroethylene).

6. The card according to claim 1, wherein said magnetic medium exhibits a saturation magnetization of over 60 emu/cm$^3$ and a switching field distribution/coercive field ratio of less than 0.50.

7. The card according to claim 6, wherein said magnetic medium exhibits a saturation magnetization of over 80 emu/cm$^3$ and a switching field distribution/coercive field ratio of less than 0.30.

8. A method for the manufacture of the magnetic memory card according to claim 1 wherein two or more polycarbonate sheets are hot welded under pressure, at least one outermost surface of the plastic sheets having said magnetic recording medium thereon, said magnetic recording medium then being applied to a polished glass plate via pressing.

9. The method according to claim 8, wherein said pressing is hot pressing carried out at a temperature higher than the glass transition temperatures of the polycarbonate sheet material and of the binder, but lower than the degradation temperature of the binder.

10. The method according to claim 8 or claim 9, wherein hot pressing is carried out at a temperature of between 160° C. and 180° C.

11. The method according to claim 9, wherein the hot pressing is carried out at a pressure of between 100 and 1000 N/cm$^2$.

12. The method according to claims 9 or 11, wherein the binder is cross-linked during the hot-pressing of the card.

13. The method according to claim 10 wherein the binder is cross-linked during the hot-pressing of the card.

* * * * *

UNITED STATES PATENT AND TRADEMARK OFFICE
CERTIFICATE OF CORRECTION

PATENT NO. : 5,395,672
DATED : March 7, 1995
INVENTOR(S) : Bernard Pingaud

It is certified that error appears in the above-indentified patent and that said Letters Patent is hereby corrected as shown below:

Column 1, line 47, "protection protection, are" should read
--protection are--.

Column 3, line 29, "erased by by" should read --erased by--;
line 66, "mid-height H", should read
--mid-height $\Delta$ H--.

Column 4, line 7, "smaller and and better" should read
--smaller and better--.

Column 5, line 43, "important" should read --importance--.

UNITED STATES PATENT AND TRADEMARK OFFICE
CERTIFICATE OF CORRECTION

PATENT NO. : 5,395,672
DATED : March 7, 1995
INVENTOR(S) : Bernard Pingaud

It is certified that error appears in the above-indentified patent and that said Letters Patent is hereby Column 11, Table "

TABLE

| Examples | 1 | 2 | 3 | 4 | 5 | 6 |
|---|---|---|---|---|---|---|
| Magnetic characteristics | | | | | | |
| Coercive field Oe | 4650 | 4850 | 5000 | 5000 | 6000 | 5700 |
| (kA/m) | (370) | (386) | (398) | (398) | (477) | (453) |
| SFD Oe | 2000 | 2000 | 1700 | 1200 | 1200 | 1350 |
| (kA/m) | (159) | (159) | (135) | (95) | (95) | (107) |
| Im emu/cm$^3$ | 82 | 86 | 69 | 89 | 91 | 99 |
| SFD/Hc | 0.43 | 0.41 | 0.34 | 0.24 | 0.20 | 0.24 |
| Mechanical characteristics | | | | | | |
| Electric wear test | | | | | | |
| for 2,000 passes | <1% | <1% | <1% | | | |
| for 24,000 passes | | | | <1% | <1% | <1% |
| Roughness nm | 6.5 | 7.8 | 8.8 | 9 | 7 2 | 6.2 |
| Abrasive characteristic (μm) | 510 | 425 | 510 | 400 | 480 | 400 |
| Scratch resistance (μm) | 1.25 | 0.85 | 1.25 | 0.37 | 0.93 | 0.67 |

"

should read

--

TABLE

| Examples | 1 | 2 | 3 | 4 | 5 | 6 |
|---|---|---|---|---|---|---|
| Magnetic characteristics | | | | | | |
| Coercive field Oe | 4650 | 4850 | 5000 | 5000 | 6000 | 5700 |
| (kA/m) | (370) | (386) | (398) | (398) | (477) | (453) |
| SFD Oe | 2000 | 2000 | 1700 | 1200 | 1200 | 1350 |
| (kA/m) | (159) | (159) | (135) | (95) | (95) | (107) |
| Im emu/cm$^3$ | 82 | 86 | 69 | 89 | 91 | 99 |
| SFD/Hc | 0.43 | 0.41 | 0.34 | 0.24 | 0.20 | 0.24 |
| Mechanical characteristics | | | | | | |
| Electric wear test | | | | | | |
| for 2,000 passes | < 1% | < 1% | < 1% | | | |
| for 24,000 passes | | | | < 1% | < 1% | < 1% |
| Roughness (nm) | 6.5 | 7.8 | 8.8 | 9 | 7 2 | 6.2 |
| Abrasive characteristic (μm) | 510 | 425 | 510 | 400 | 480 | 400 |
| Scratch resistance (μm) | 1.25 | 0.85 | 1.25 | 0.37 | 0.93 | 0.67 |

--

UNITED STATES PATENT AND TRADEMARK OFFICE
CERTIFICATE OF CORRECTION

PATENT NO. : 5,395,672
DATED : March 7, 672
INVENTOR(S) :

It is certified that error appears in the above-indentified patent and that said Letters Patent is hereby corrected as shown below:

Column 12, line 15, after "field" add --distribution to the coercive field that is equal to or smaller than 0.40 and a saturation magetization of over 60 emu/gf.--

Signed and Sealed this

Twenty-second Day of October, 1996

Attest:

BRUCE LEHMAN

*Attesting Officer*  *Commissioner of Patents and Trademarks*